United States Patent
Ekonen et al.

(10) Patent No.: US 8,764,599 B2
(45) Date of Patent: Jul. 1, 2014

(54) AWD VEHICLE WITH ACTIVE DISCONNECT COUPLING HAVING CONTROLLED LUBRICATION

(71) Applicants: Todd Ekonen, Howell, MI (US); Johannes Quehenberger, Hinterhagweg (AT)

(72) Inventors: Todd Ekonen, Howell, MI (US); Johannes Quehenberger, Hinterhagweg (AT)

(73) Assignee: MAGNA Powertrain of America, Inc., Troy, MI (US)

( * ) Notice: Subject to any disclaimer, the term of this patent is extended or adjusted under 35 U.S.C. 154(b) by 0 days.

(21) Appl. No.: 13/779,959

(22) Filed: Feb. 28, 2013

(65) Prior Publication Data

US 2013/0178321 A1    Jul. 11, 2013

Related U.S. Application Data

(63) Continuation of application No. 12/851,940, filed on Aug. 6, 2010, now Pat. No. 8,388,486.

(60) Provisional application No. 61/232,882, filed on Aug. 11, 2009.

(51) Int. Cl.
| | |
|---|---|
| *F16H 57/04* | (2010.01) |
| *F16H 37/02* | (2006.01) |
| *F16H 48/06* | (2006.01) |
| *B60K 17/356* | (2006.01) |
| *F16H 48/08* | (2006.01) |
| *B60K 17/16* | (2006.01) |
| *B60K 17/348* | (2006.01) |
| *B60K 23/08* | (2006.01) |
| *B60T 8/32* | (2006.01) |

(52) U.S. Cl.
CPC .............. *F16H 57/043* (2013.01); *F16H 57/04* (2013.01); *F16H 48/08* (2013.01); *B60K 17/16* (2013.01); *B60K 17/348* (2013.01); *B60K 23/0808* (2013.01); *B60T 8/322* (2013.01)
USPC ........... 475/221; 475/220; 475/223; 475/230; 475/159; 180/244

(58) Field of Classification Search
CPC ......... F16H 48/08; F16H 48/10; F16H 48/12; F16H 48/145; F16H 48/147; F16H 57/04; F16H 57/042; F16H 57/0421; F16H 57/043; F16H 57/0456; B60K 17/16; B60K 17/34; B60K 17/346; B60K 17/348; B60K 23/04; B60K 23/0808; B60T 8/322
See application file for complete search history.

(56) References Cited

U.S. PATENT DOCUMENTS

| | | | | |
|---|---|---|---|---|
| 4,817,753 | A * | 4/1989 | Hiketa ......................... | 180/249 |
| 5,105,901 | A * | 4/1992 | Watanabe et al. ............. | 180/249 |
| 6,135,229 | A * | 10/2000 | Arimatsu ...................... | 180/248 |
| 6,817,434 | B1 * | 11/2004 | Sweet ........................... | 180/245 |
| 7,175,013 | B2 * | 2/2007 | Burns et al. ................ | 192/70.12 |
| 8,177,672 | B2 * | 5/2012 | Kato et al. .................... | 475/198 |
| 2004/0192487 | A1 * | 9/2004 | Teraoka ........................ | 475/198 |
| 2006/0058146 | A1 * | 3/2006 | Brissenden et al. .......... | 475/198 |

FOREIGN PATENT DOCUMENTS

GB         2407804      *   5/2005

* cited by examiner

*Primary Examiner* — David D Le
*Assistant Examiner* — Colby M Hansen
(74) *Attorney, Agent, or Firm* — Dickinson Wright PLLC

(57) ABSTRACT

A vehicle drive train includes a first power disconnection device and a first driveline for transferring torque to a first set of wheels. A second driveline for transferring torque to a second set of wheels includes a differential gearset having an output coupled to a second power disconnection device. A hypoid gearset is positioned within the second driveline in a power path between the first and second power disconnection devices. The second power disconnection device includes a clutch having a first set of clutch plates fixed for rotation with the differential gearset output. The clutch further includes a second set of clutch plates fixed for rotation with a shaft adapted to transfer torque to one of the wheels of the second set of wheels. A valve limits a flow of coolant to the clutch when the second power disconnection device operates in a disconnected mode.

10 Claims, 5 Drawing Sheets

AWD VEHICLE WITH ACTIVE DISCONNECT COUPLING HAVING CONTROLLED LUBRICATION

CROSS-REFERENCE TO RELATED APPLICATIONS

This application is a continuation of U.S. patent application Ser. No. 12/851,940 filed on Aug. 6, 2010, now U.S. Pat. No. 8,388,486, which claims the benefit of U.S. Provisional Patent Application No. 61/232,882, filed on Aug. 11, 2009. The entire disclosures of the above applications are incorporated herein by reference.

FIELD

The present disclosure relates to a driveline for a motor vehicle having a system for disconnecting a hypoid ring gear from rotating at driveline speed. In particular, a power transfer device such as a power take-off unit or a transfer case includes a coupling for ceasing the transfer of torque from a power source to the hypoid ring gear of a secondary driveline while another disconnect selectively interrupts the flow of power from a vehicle wheel to the hypoid ring gear on the secondary driveline.

BACKGROUND

Typical power take-off units transfer power from a transaxle in receipt of torque from a vehicle power source. The power take-off unit transfers power to a propeller shaft through a gear arrangement that typically includes a hypoid cross-axis gearset. Other gear arrangements such as parallel axis gears may be provided within the power take-off unit to provide additional torque reduction.

Power take-off units have traditionally been connected to the transaxle output differential. Accordingly, at least some of the components of the power take-off unit rotate at the transaxle differential output speed. Power losses occur through the hypoid gear churning through a lubricating fluid. Efficiency losses due to bearing preload and gear mesh conditions are also incurred while the components of the power take-off unit are rotated.

Similar energy losses occur when other driveline components are rotated. For example, many rear driven axles include hypoid gearsets having a ring gear at least partially immersed in a lubricating fluid. In at least some full-time all-wheel drive configurations, the rear drive axle hypoid gearset continuously rotates during all modes of operation and transmits a certain level of torque. In other applications, the rear axle hypoid gearset still rotates but without the transmission of torque whenever the vehicle is moving. In other configurations, a transfer case selectively transfers power to a front drive axle equipped with a front drive axle hypoid gearset. Regardless of the particular configuration, churning and parasitic losses convert energy that could have been transferred to the wheels into heat energy that is not beneficially captured by the vehicle. As such, an opportunity may exist to provide a more energy efficient vehicle driveline.

SUMMARY

A vehicle drive train includes a first driveline being adapted to transfer torque to a first set of wheels and includes a first power disconnection device. A second driveline is adapted to transfer torque to a second set of wheels and includes a differential gearset having an output coupled to a second power disconnection device. A hypoid gearset is positioned within the second driveline in a power path between the first and second power disconnection devices. The second power disconnection device includes an active multi-plate clutch having a first set of clutch plates fixed for rotation with the differential gearset output. The clutch further includes a second set of clutch plates fixed for rotation with an output shaft adapted to transfer torque to one of the wheels of the second set of wheels. A valve is operable to limit a flow of coolant to the multi-plate clutch when the second power disconnection device operates in the disconnected mode.

In another form, a vehicle drive train includes a first driveline adapted to transfer torque from a power source to a first set of wheels and includes a power take-off unit. A second driveline includes a hypoid gearset in receipt of torque from the first driveline. The power take-off unit includes a first power disconnection device selectively ceasing the transfer of torque to the hypoid gearset. The second driveline transfers torque to a second set of wheels and includes a second power disconnection device selectively interrupting a transfer of torque from the second set of wheels to the hypoid gearset. The second power disconnection device includes a multi-plate clutch controlled by a ball ramp actuator selectively providing a first rate of axial apply plate travel per degree of rotation and a second lesser rate of axial apply plate travel per degree of rotation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
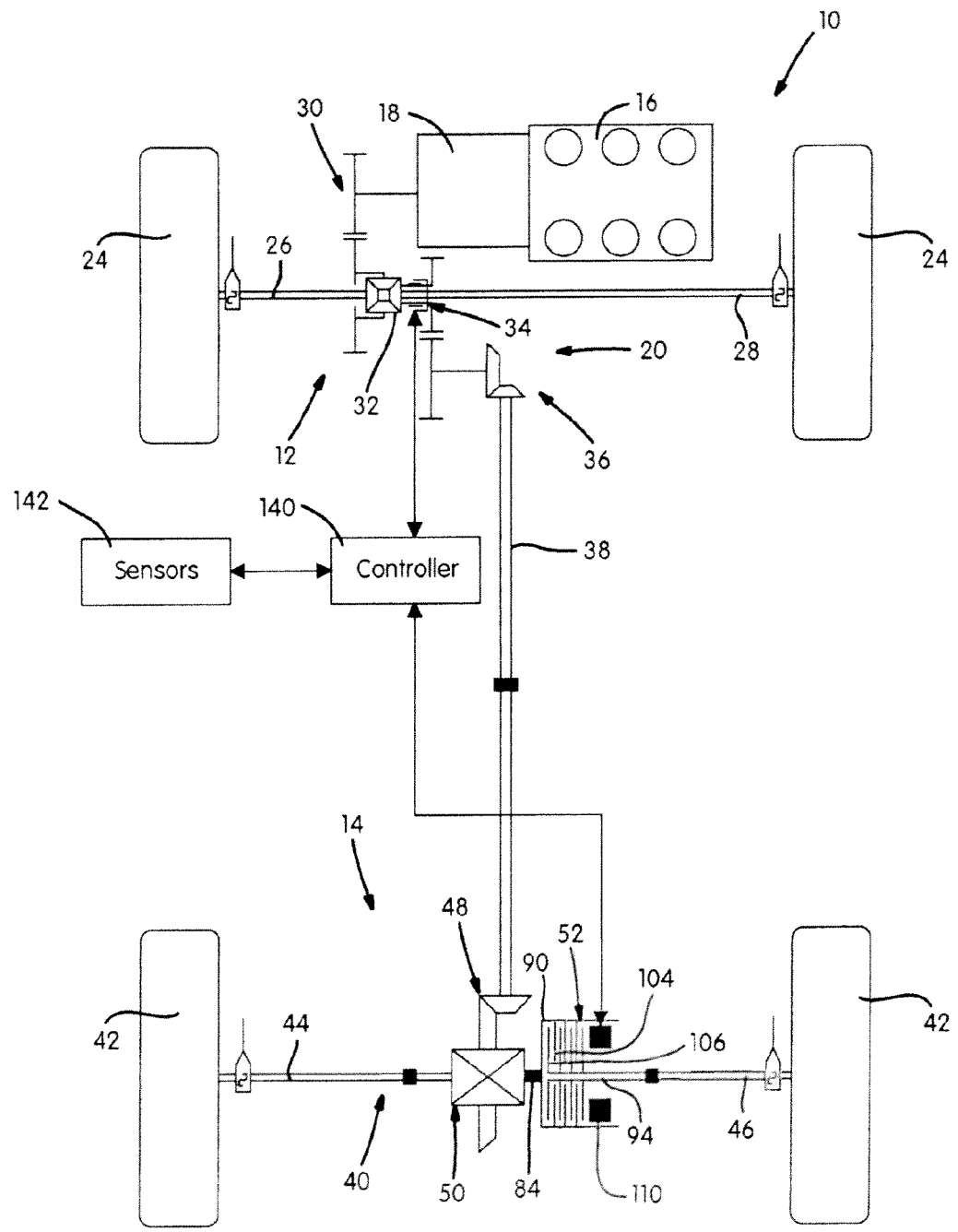
FIG. 1 is a schematic of an exemplary vehicle equipped with a vehicle drive train of the present disclosure.

The following description is merely exemplary in nature and is not intended to limit the present disclosure, application, or uses. It should be understood that throughout the drawings, corresponding reference numerals indicate like or corresponding parts and features.

In general, the present disclosure relates to a coupling and hypoid disconnect system for a driveline of a motor vehicle. A power take-off unit may be equipped with an active coupling or a dog clutch/synchronizer to disconnect the power source from a portion of the driveline and to reconnect through synchronization of said driveline. Additionally, another active coupling may be provided to disconnect a portion of the driveline from the vehicle wheels. The hypoid gearing of the vehicle driveline may be separated from the driving source of power to reduce churning losses and other mechanical inefficiencies.

With particular reference to FIG. 1 of the drawings, a drive train 10 of a four-wheel drive vehicle is shown. Drive train 10 includes a front driveline 12 and a rear driveline 14 both drivable from a source of power, such as an engine 16 through a transmission 18 which may be of either the manual or automatic type. In the particular embodiment shown, drive train 10 is a four-wheel system incorporating a power transmission device 20 for transmitting drive torque from engine 16 and transmission 18 to front driveline 12 and rear driveline 14. Power transmission device 20 is shown as a power take-off unit.

Front driveline 12 is shown to include a pair of front wheels 24 individually driven by a first axle shaft 26 and a second axle shaft 28. Front driveline 12 also includes a reduction speed gearset 30 and a differential assembly 32. Power transmission device 20 includes a clutch 34 and a right-angled drive assembly 36. Clutch 34 may be configured as a dog clutch, a synchronized clutch, a roller clutch, a multi-plate clutch, or another torque transferring disconnection mechanism. If speed synchronization may be accomplished between the rotating members to be connected, a simple dog clutch may suffice. However, under certain conditions, the reconnection of a previously disconnected driveline may become more challenging due to rotational speed differences across the power disconnection device. For example, front wheel slip may occur that will result in the front driveline speed being greater than the rotational speed of rear driveline components being driven by the rear wheels. In this case, a speed differential will be realized across the power disconnection device making it difficult or impossible for a dog clutch to be actuated from a non-torque transferring mode to a torque transferring mode. Accordingly, a roller clutch or synchronizer may be implemented at any of the locations depicted as a dog clutch or similar power disconnection device. By implementing the roller clutch or synchronizer, a controller may initiate reconnection and torque transfer once a specified range of speed difference between the two members being connected is met. This control arrangement may result in improved system performance including a reduction in the time required to operate the vehicle in one of the drive modes.

Rear driveline 14 includes a propeller shaft 38 connected at a first end to right-angled drive assembly 36 and at an opposite end to a rear axle assembly 40. Rear driveline 14 also includes a pair of rear wheels 42 individually driven by a first rear axle shaft 44 and a second rear axle shaft 46. Rear axle assembly 40 also includes a hypoid ring and pinion gearset 48 driving a differential assembly 50. A disconnect coupling 52 may selectively drivingly connect and disconnect second rear axle shaft 46 from ring and pinion gearset 48 and differential assembly 50.

Figure 2:
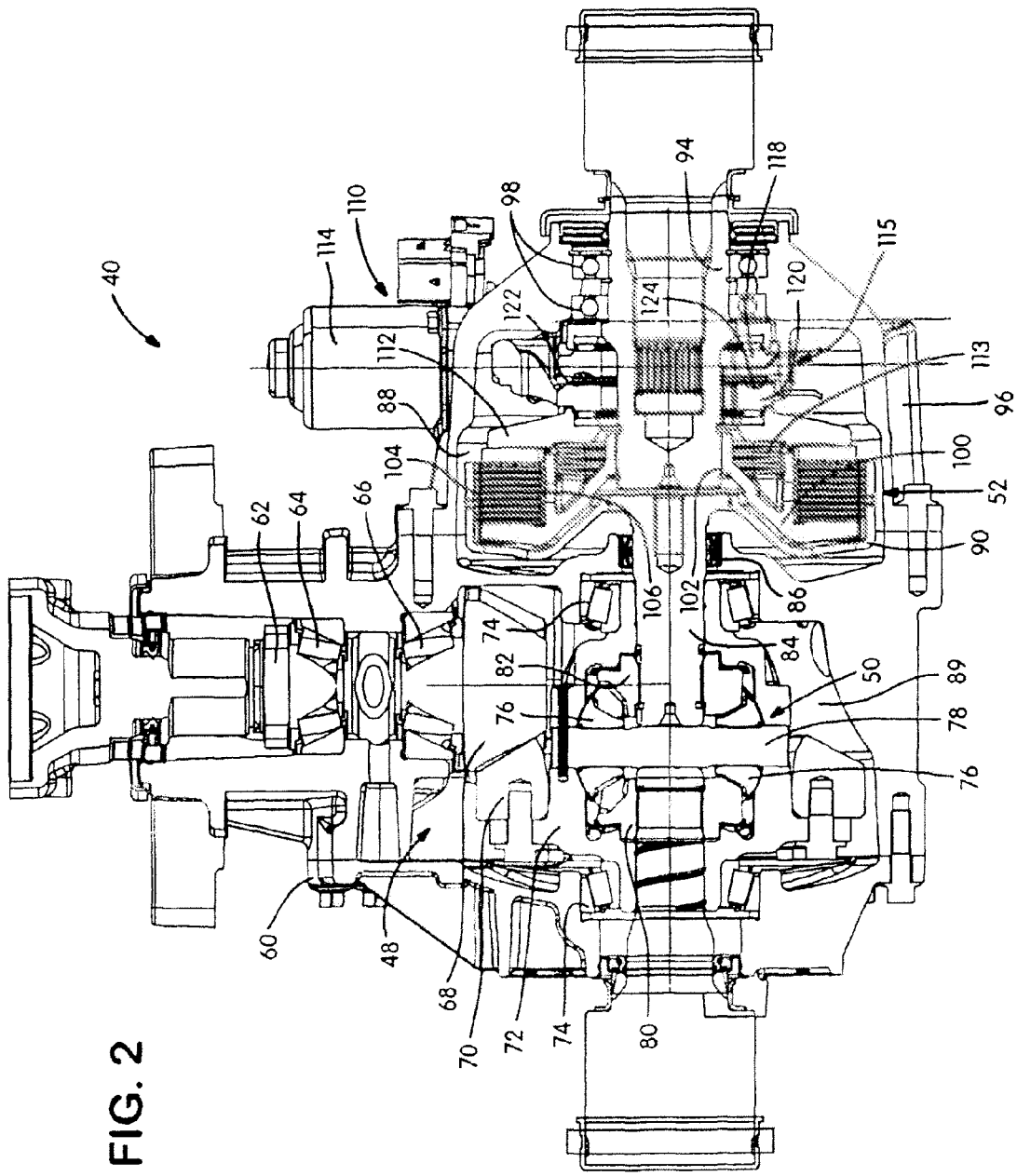
FIG. 2 is a fragmentary cross-sectional view of a rear drive axle including a disconnect coupling.
Figure 3:
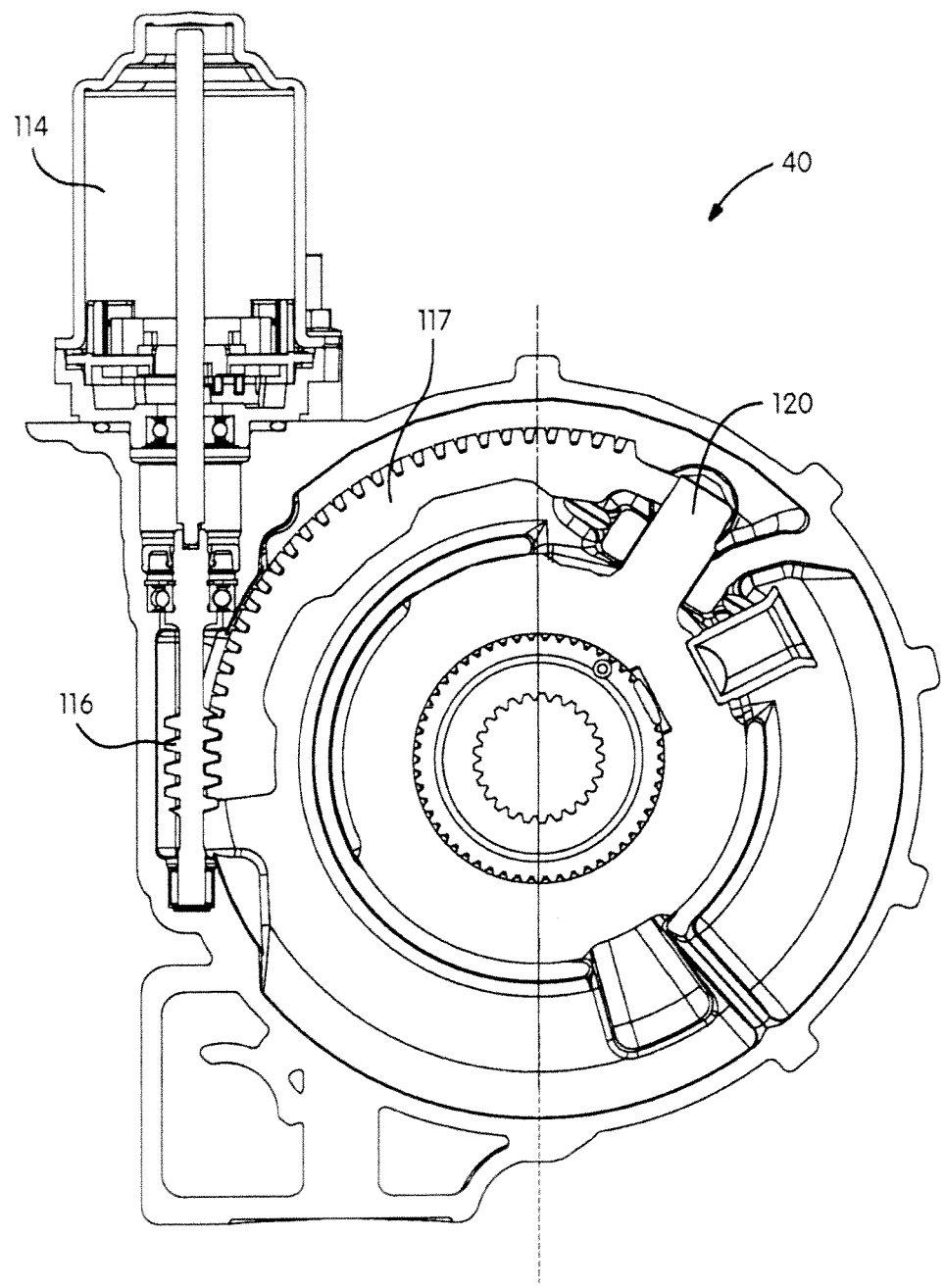
FIG. 3 is a fragmentary cross-sectional view of a ball ramp actuation mechanism.
Figure 4:
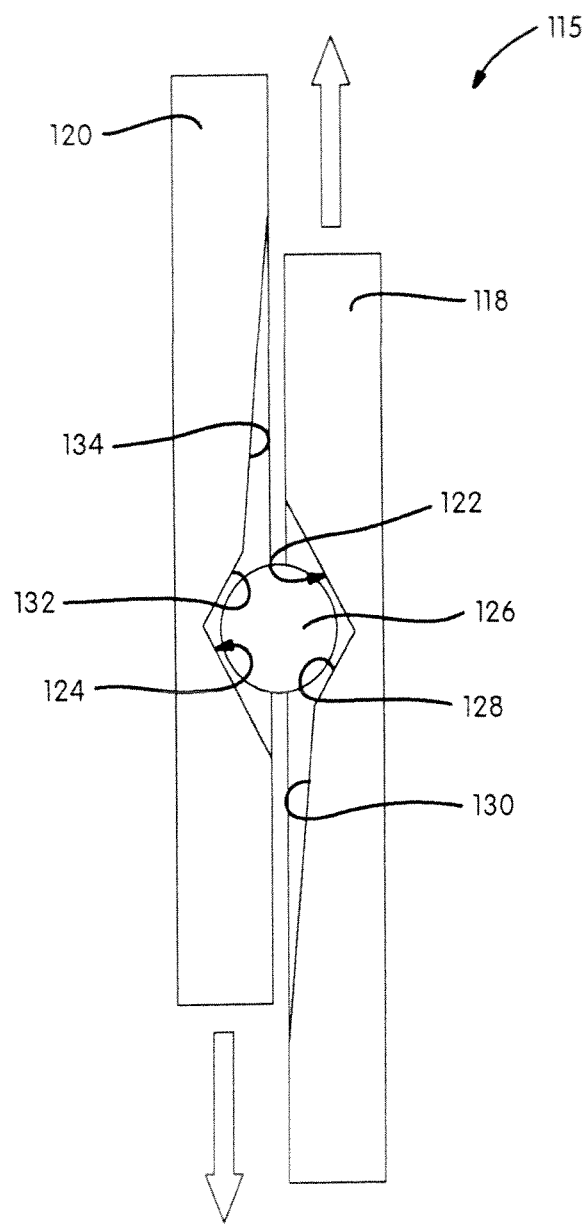
FIG. 4 is a fragmentary sectional view of another portion of the ball ramp mechanism.

FIG. 2-4 depict portions of rear axle assembly 40. A housing 60 rotatably supports a pinion shaft 62 of ring and pinion gearset 48 via bearings 64, 66. A pinion gear 68 is integrally formed with pinion shaft 62. Ring and pinion gearset 48 also includes a ring gear 70 in meshed engagement with pinion gear 68 and fixed for rotation with a carrier 72. Carrier 72 is rotatably supported within housing 60 by bearings 74. Differential assembly 50 includes a pair of pinion gears 76 supported on a cross pin 78 fixed to carrier 72. First and second side gears 80, 82 are in meshed engagement with pinion gears 76. Second side gear 82 is fixed for rotation with a stub shaft 84. Bearing 74 rotatably supports stub shaft 84 within housing 60. Seals 86 engage stub shaft 84 and separate a cavity 88 containing disconnect coupling 52 from a cavity 89 containing differential assembly 50.

Disconnect coupling 52 includes a drum 90 fixed for rotation with stub shaft 84. A driven spindle 94 is rotatably supported within a removable portion 96 of housing 60 by bearings 98. A hub 100 is fixed for rotation with driven spindle 94 via a splined connection 102. Disconnect coupling 52 also includes a plurality of outer friction plates 104 fixed for rotation with and axially moveable relative to drum 90 as well as a plurality of inner friction plates 106 fixed for rotation with and being axially moveable relative to hub 100. Outer friction plates 104 are interleaved with inner friction plates 106.

A clutch actuator 110 is operable to selectively apply a force to an actuator plate 112 for compressing outer clutch plates 104 and inner clutch plates 106 to transfer torque between stub shaft 84 and driven spindle 94. A spring 113 is positioned to engage hub 100 and actuator plate 112 to urge actuator plate 112 away from clutch plates 104, 106. Actuator 110 includes an electric motor 114 driving a ball ramp mechanism 115 via a worm gear 116 and sector gear 117. Ball ramp mechanism 115 includes a first cam plate 118 spaced apart from a second cam plate 120. First cam plate 118 includes a plurality of tapered grooves 122. Second cam plate 120 includes a corresponding pair of tapered grooves 124 that are circumferentially spaced apart from one another and positioned to oppose first grooves 122. Balls 126 are positioned within pairs of tapered grooves 122, 124. Relative rotation between first cam plate 118 and second cam plate 120 causes second cam plate 120 to translate and axially move actuator plate 112.

As shown in FIG. 4, first tapered grooves 122 include a relatively steep ramp angle portion 128 adjacent to a relatively shallow ramp angle portion 130. Second grooves 124 also include corresponding steep and shallow ramp angle portions 132 and 134, respectively. To reduce frictional losses across disconnect coupling 52 when the coupling is operated in an open or disconnected mode, it may be advantageous to space outer friction plates 104 from inner friction plates 106 a maximum distance from one another. The shape and depth of first grooves 122 and second grooves 124 acting with spring 113 may accomplish this task. However, a relatively large distance needs to be traversed when torque transfer across disconnect coupling 52 is desired. The steep ramp angle portions 128, 132 function to accomplish this goal by axially translating second cam plate 120 a relatively large amount based on a relatively small amount of relative rotation between first cam plate 118 and second cam plate 120. Once most of the clearance between outer clutch plates 104, inner clutch plates 106 and actuator plate 112 has been removed, balls 126 act on the relatively shallow ramp angle portions 130, 134 to apply an amplified force and control the torque generated by disconnect coupling 52.

Clutch actuator 110 may alternatively include a hydraulic motor, or some other source of energy to cause relative rotation between first cam plate 118 and second cam plate 120. Furthermore, it should be appreciated that ball ramp mechanism 115 may be replaced by a hydraulic actuation system with similar behavior. In a first step, a piston in the hydraulic system travels quickly with a small available force. In a second step, the piston travels slowly, but with a high possible actuation force. An exemplary system is described within U.S. Patent Application Publication No. 2009/038908 which is hereby incorporated by reference.

During vehicle operation, it may be advantageous to reduce the churning losses associated with driving ring and pinion gearset 48 and right-angled drive assembly 36. A controller 140 is in communication with a variety of vehicle sensors 142 providing data indicative of parameters such as vehicle speed, four-wheel drive mode, wheel slip, vehicle acceleration and the like. At the appropriate time, controller 140 outputs a signal to control clutch 34 and place it in a deactuated mode where torque is not transferred from engine 16 to rear driveline 14. Controller 140 also signals clutch actuator 110 associated with disconnect coupling 52 such that energy associated with rotating rear wheels 42 will not be transferred to ring and pinion gearset 48 or differential assembly 50. Accordingly, the hypoid gearsets do not rotate at the rotational output speed of differential assembly 32, nor do they rotate at the rotational speed of rear wheels 42. The hypoid gearsets are disconnected from all sources of power and are not driven at all.

It is contemplated that any one or more of the previously described clutches including interleaved inner and outer clutch plates may be either a wet clutch or a dry clutch. Wet clutches are lubricated and cooled with a fluid that may be pumped or sloshed across the friction surfaces of the inner and outer clutch plates. The wet clutches provide excellent torque transfer characteristics and operate in a sealed environment containing the lubricant. A pump (not shown) may provide pressurized fluid to cool the wet clutch. Alternatively, the fluid acting on the clutch plates may be the same fluid used to lubricate members of the gear train including the ring and pinion gears.

Figure 5:
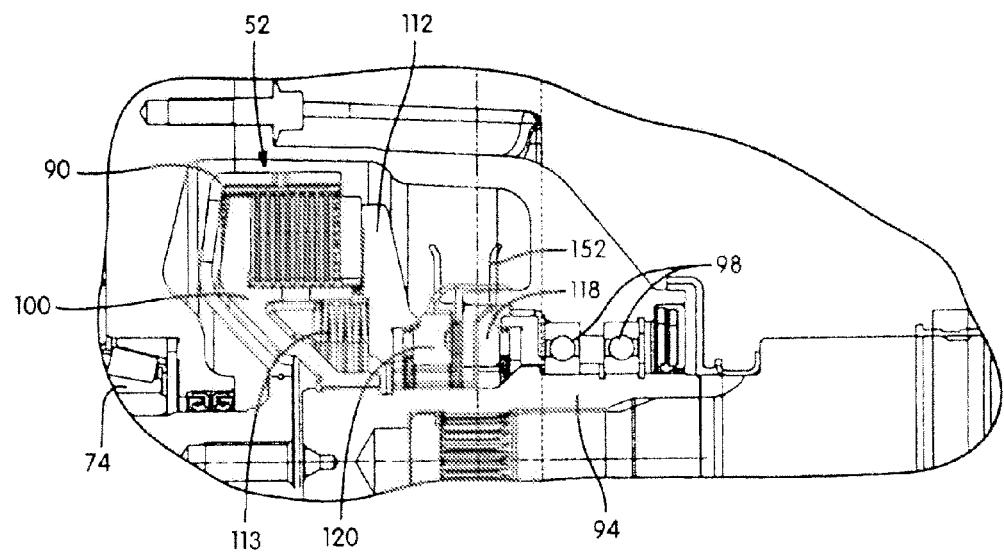
FIG. 5 is a partial fragmentary cross-sectional view of a rear drive axle having a clutch lubrication flow valve.
Figure 6:
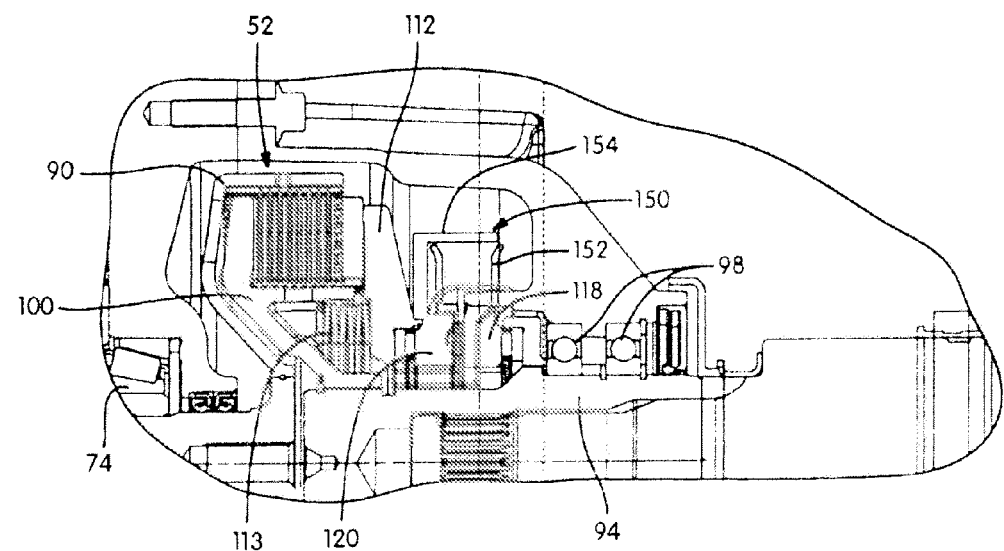
FIG. 6 is a fragmentary cross-sectional view of the axle and the clutch lubrication flow valve having a flow reducer in a position to restrict fluid flow.

When a wet plate clutch is used as a disconnect device and active all wheel drive coupling, viscous drag torque losses are associated with the plates of the wet clutch shearing through the fluid in contact with the plates. To reduce the drag losses within the wet clutch, the inner and outer plates may be axially spaced apart from one another a relatively large distance, as previously discussed. To further reduce the fluid shearing losses, actuator 110 may include a valve 150 associated with a clutch lubrication pickup tube 152. Lubrication pickup tube 152 is stationary within housing 60 and may be fixed to first cam plate 118. Valve 150 functions to control lubricant flow in the vicinity of outer clutch plates 104 and inner clutch plates 106. When disconnect coupling 52 is in a torque transferring mode, a substantial flow of lubricant is allowed. When disconnect coupling 52 is in the open or disconnected mode, valve 150 functions to restrict or discontinue the flow of lubricant to the friction plates 104, 106. With the lubricant flow restricted or stopped, fluid previously positioned between outer clutch plates 104 and inner clutch plates 106 will drain such that the shearing losses will be further reduced. More particularly, and as shown in FIGS. 5 and 6, it is contemplated that valve 150 includes a flow reducer 154 fixed to second cam plate 120. Flow reducer 154 is shown rotated out of a flow restricting position in FIG. 5. FIG. 6 depicts flow reducer 154 blocking at least a portion of pickup tube 152. The angular orientation of second cam plate 120 determines the position of flow reducer 154.

By positioning actuator 110 within housing 60 as previously discussed, the forces generated by disconnect coupling 52 and its associated actuator 110 are retained and reacted in housing portion 96 thus minimizing any losses across support bearings 74 or 98, thereby improving system control and accuracy. Furthermore, the actuation forces related to operating disconnect coupling 52 are not influenced by forces generated by ring and pinion gearset 48 or differential assembly 50, thus improving control accuracy and reducing drag losses.

It should be appreciated that the concepts previously discussed regarding the operation and location of multiple disconnects in relation to a transverse oriented engine and transmission as depicted in FIG. 1 may also be applied to a longitudinal engine arrangement. While a number of vehicle drivelines have been previously described, it should be appreciated that the particular configurations discussed are merely exemplary. As such, it is contemplated that other combinations of the components shown in the Figures may be arranged with one another to construct a drive train not explicitly shown but within the scope of the present disclosure.

What is claimed is:

1. A vehicle drivetrain for transferring drive torque from a power source to first and second sets of wheels, the drivetrain comprising:
a first driveline configured to transfer drive torque from the power source to the first set of wheels; and
a second driveline configured to transfer drive torque from the power source to the second set of wheels, the second driveline including a hypoid gearset driven by the power source, a differential assembly driven by the hypoid gearset, and a disconnect coupling operably disposed between the differential assembly and the second set of wheels, wherein the disconnect coupling includes a multi-plate clutch disposed between an output gear of the differential assembly and an output shaft connected to one of the second set of wheels, a clutch actuator operable in a first mode to disengage the multi-plate clutch and interrupt the transfer of drive torque between the output gear and the output shaft and operable in a second mode to engage the multi-plate clutch and transfer drive torque between the output gear and the output shaft, and a valve operable to limit a flow of lubricant to the multi-plate clutch when the clutch actuator operates in its first mode and to permit the flow of lubricant to the multi-plate clutch when the clutch actuator operates in its second mode;
wherein the valve is controlled in response to a rotational position of the clutch actuator, wherein the clutch actuator includes a non-rotary first component and a rotary second component such that rotation of the second component relative to the first component between a first position and a second position acts to shift the clutch actuator between its first mode and its second mode, and wherein the valve is mounted to the rotary second component of the clutch actuator and is moveable therewith relative to a lubrication device providing lubricant to the multi-plate clutch, the valve being positioned to close the lubrication device when the second component is rotated to its first position so as to limit the flow of lubricant to the multi-plate clutch, the valve being positioned to open the lubrication device when the second component is rotated to its second position so as to permit the flow of lubricant to the multi-plate clutch.

2. The vehicle drivetrain of claim 1 wherein the clutch actuator includes a ball ramp unit having a first non-rotary cam defining the first component and a second rotary cam defining the second component, and wherein the rotation of the second cam from its first position to its second position acts to locate the valve for opening the lubrication device and rotation of the second cam from its second position to its first position acts to locate the valve for closing the lubrication device.

3. The vehicle drivetrain of claim 1 wherein the second driveline further includes a second hypoid gearset adapted to drive the first hypoid gearset, and a second disconnect coupling operable for selectively interrupting the transfer of drive torque from the power source to the second hypoid gearset.

4. A vehicle drivetrain for transferring torque to first and second sets of wheels, the drivetrain comprising:
a first driveline adapted to transfer torque to the first set of wheels and including a first power disconnection device;
a second driveline adapted to transfer torque to the second set of wheels and including a differential assembly and a second power disconnection device, the second power disconnection device including a multi-plate clutch and a clutch actuator, the multi-plate clutch being disposed between an output gear of the differential assembly and an output shaft connected to one of the second set of wheels, the clutch actuator being operable to control engagement of the multi-plate clutch for shifting the second power disconnection device a disconnected, non-torque transferring mode and a connected, torque transferring mode;
a hypoid gearset positioned within the second driveline in a power path between the first and second power disconnection devices, wherein the hypoid gearset is selectively disconnected from being driven by either of the first driveline and the second driveline when the first and second power disconnection devices are operated in a disconnected, non-torque transferring mode; and
a valve operable to permit flow of lubricant to the multi-plate clutch when the second power disconnection device operates in the connected mode and to limit the flow of lubricant to the multi-plate clutch when the second power disconnection device operates in the disconnected mode;
wherein the clutch actuator includes a ball ramp mechanism having a rotary cam member, and wherein the valve is fixed for rotation with the rotary cam member such that the rotational position of the cam member controls the valve.

5. The vehicle drivetrain of claim 4 wherein the first power disconnection device is positioned within a power take-off unit and includes a multi-plate clutch.

6. The vehicle drivetrain of claim 4 wherein the first driveline includes another hypoid gearset positioned in the power path between the first and second power disconnection devices.

7. A vehicle drivetrain for transferring torque from a power source to first and second sets of wheels, the drivetrain comprising:
a first driveline adapted to transfer torque from the power source to the first set of wheels and including a power take-off unit; and
a second driveline including a hypoid gearset in receipt of torque from the first driveline, the power take-off unit including a first power disconnection device selectively operable in a disconnected mode for interrupting the transfer of torque to the hypoid gearset, the second driveline transferring torque to the second set of wheels and including a second power disconnection device selectively operable in a disconnected mode for interrupting the transfer of torque from the second set of wheels to the hypoid gearset, wherein the second power disconnection device includes a multi-plate clutch controlled by a ball ramp actuator and a valve operable to limit flow of lubricant to the multi-plate clutch when the ball ramp actuator shifts the second power disconnection device into its disconnected mode, wherein the valve is controlled by a rotational position of the ball ramp actuator, wherein the ball ramp actuator includes a rotary cam member, and wherein the valve is fixed for rotation with the rotary cam member.

8. The vehicle drivetrain of claim 7 wherein the ball ramp actuator includes a non-rotary cam member and the rotary cam member such that rotation of the rotary cam member relative to the non-rotary cam member between a first position and a second position acts to shift the second disconnection mechanism between its disconnected mode and a connected mode for transferring torque through the multi-plate clutch from the second set of wheels to the hypoid gearset.

9. The vehicle drivetrain of claim 8 wherein the valve is mounted to the rotary cam member and is moveable therewith relative to a lubrication device configured to provide the lubricant to the multi-plate clutch, wherein the valve closes the lubrication device when the rotary cam member is located in its first position to limit flow of the lubricant to the multi-plate clutch, and wherein the valve opens the lubrication device when the rotary cam member is located in its second position to permit the lubricant to flow to the multi-plate clutch.

10. The vehicle drivetrain of claim 7 wherein the ball ramp actuator includes a ball ramp mechanism having a non-rotary cam member and the rotary cam member, wherein rotation of the rotary cam member from a first position to a second position acts to locate the valve for opening a lubrication device and rotation of the rotary cam member from its second position to its first position acts to locate the valve for closing the lubrication device, and wherein the lubrication device is in fluid communication with the multi-plate clutch.

* * * * *